(12) United States Patent
Bigelow

(10) Patent No.: US 6,899,301 B2
(45) Date of Patent: May 31, 2005

(54) METHOD FOR MAKING AN OPENING IN THE BLADDER OF AN INFLATABLE MODULAR STRUCTURE FOR RECEIVING A WINDOW

(75) Inventor: Robert T. Bigelow, Las Vegas, NV (US)

(73) Assignee: Bigelow Aerospace, North Las Vegas, NV (US)

( * ) Notice: Subject to any disclaimer, the term of this patent is extended or adjusted under 35 U.S.C. 154(b) by 7 days.

(21) Appl. No.: 10/668,457

(22) Filed: Sep. 23, 2003

(65) Prior Publication Data

US 2005/0061918 A1    Mar. 24, 2005

(51) Int. Cl.$^7$ ................................. B64G 1/12
(52) U.S. Cl. .................... 244/159; 52/745.15
(58) Field of Search ............... 244/125, 126, 244/159, 162; 52/2.19, 2.24, 745.15

(56) References Cited

U.S. PATENT DOCUMENTS

| | | | | |
|---|---|---|---|---|
| 4,934,631 A | * | 6/1990 | Birbas | .................. 244/30 |
| 5,429,851 A | * | 7/1995 | Sallee | ..................... 428/71 |
| 5,580,013 A | * | 12/1996 | Velke | ..................... 244/159 |
| 5,893,238 A | * | 4/1999 | Peacock et al. | ............. 52/2.18 |
| 6,231,010 B1 | | 5/2001 | Schneider et al. | |
| 6,439,508 B1 | | 8/2002 | Taylor | |
| 6,547,189 B1 | | 4/2003 | Raboin et al. | |

* cited by examiner

Primary Examiner—Robert P. Swiatek
(74) Attorney, Agent, or Firm—Franklin E. Gibbs

(57) ABSTRACT

A method for making an opening in the bladder of an inflatable modular structure. The structure has a core comprised of a fore and aft assembly separated by a longeron. There is an inflatable bladder and a restraint layer that are secured to the core. The restraint layer is comprised of two circumferential strap assemblies; each attachedly fastened at opposing ends of a radial strap assembly, and has an opening for a window. The restraint layer fits over the bladder. The bladder is inflated and the restraint layer is used along with a window template to locate the position of the window on the bladder. The bladder is deflated, the template is removed, and the identified portion of the bladder is cut away. The method may then be repeated.

5 Claims, 4 Drawing Sheets

METHOD FOR MAKING AN OPENING IN THE BLADDER OF AN INFLATABLE MODULAR STRUCTURE FOR RECEIVING A WINDOW

BACKGROUND OF THE INVENTION

1. Field of the Invention

This invention relates to a method for making an opening in a bladder of an inflatable modular structure for receiving a window. The inflatable module structure is a versatile device for use in space and can be employed as a space based habitat. The structure is capable of being collapsed before being launched into space and then once deployed into space, the structure expands for use as a space based module. In the case where the module houses crewmembers, viewing windows are usually employed to see outside the module. The present invention is directed to a method of making an opening to receive such windows.

2. Description of the Prior Art

Space based modular human habitats are well known and inflatable modular structures for space are typified, for example, by U.S. Pat. No. 6,439,508 to Taylor, U.S. Pat. No. 6,231,010 to Schneider, et al, and U.S. Pat. No. 6,547,189 to Raboin, et al.

When crewmembers are present in a deployed module, it is important to have windows for the crewmembers to see through. This has both practical and psychological advantages.

As a practical matter, the crewmembers can view conditions external to the module. This is important when, for example, work is being performed outside the module and the crewmembers inside the module are assisting by monitoring the progress of the tasks performed external to the module.

While television cameras could be employed to perform the same function, the exclusive use of television cameras is not desirable. For example, when crewmembers are on long term assignments within a module without windows the crewmembers are effectively in an environment without a visual connection with the outside world or space. This form of sensory deprivation can have a negative impact on the crew's psychological well being.

The use of windows in a space module is not new or novel. However, placing a window in an inflatable modular habitat presents unique challenges that have no parallel when working with a solid module.

A solid shelled module is not likely to change its shape significantly when deployed into space. As a result, a window location can be easily identified on a solid shell and a window installed without the shell changing its shape. Once deployed, the window in the solid shell would be in the same location as when the window was installed on the ground.

While this is generally true even if there are layers on the surface of the solid shell, this is not the case for an inflatable module.

The shell of the inflatable module is malleable and is generally comprised of a number of layers. There is usually at least a bladder, a restraint layer, and a meteor debris shield. All of which are flexible to accommodate being collapsed for launch and inflated in space and all must have an opening so as not to obstruct the view from a window.

Another difficulty arises when installing a window that integrates with the bladder. The extent to which the bladder is inflated is at least partially dictated by the flexible restraint layer. The restraint layer serves to distribute the load from the bladder to the rigid structural core of the module and provides the outer boundary for the limit to which the bladder can distend.

If the window was attached only to the bladder, then expansion of the bladder could bulge the window out beyond the limit of the restraint layer. This would stress the bladder and could potentially cause a rupture. This is not desirable so it follows that the window must be integrated with both the bladder and the restraint layer to prevent such bulges.

What is needed is a method of making an opening in the bladder of an inflatable modular structure such that an opening in the flexible restraint layer and the opening in the bladder coincide an are used in combination for supporting a window.

The present invention may be best understood by reference to the following description taken in conjunction with the accompanying drawings.

BRIEF SUMMARY OF THE INVENTION

A method for making an opening in the bladder of an inflatable modular structure to receive a window is claimed. The modular structure includes a core, a bladder that has an external surface is attached to the core, and a flexible restraint layer is attached to the core and surrounding the bladder. The flexible restraint layer has an opening for a window. A window outline template is placed into the opening of the flexible restraint layer. The bladder is inflated and an area on the external surface of the bladder in the proximity of the window outline template is marked for the location of the window. The bladder is then deflated and the window template is removed. An area of the bladder that was identified by the window template is removed from the bladder.

DETAILED DESCRIPTION OF THE INVENTION

Figure 1:
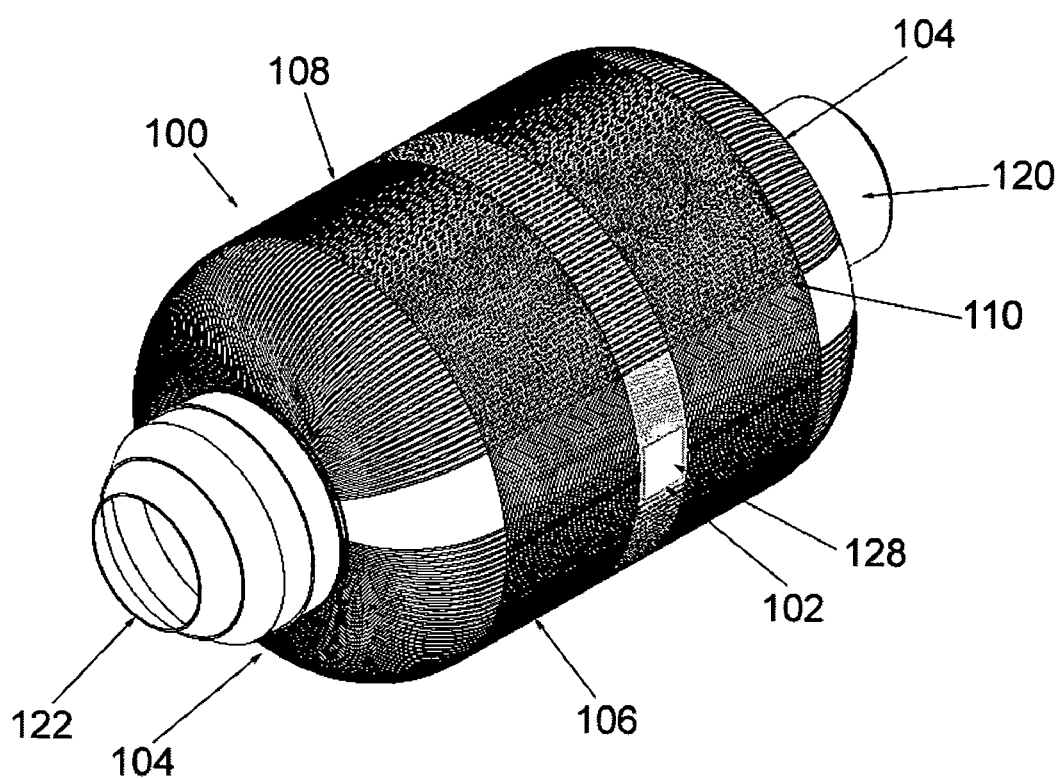
FIG. 1 is a simplified view of the flexible restraint layer.

The present invention may best be understood by reference to the following description taken in conjunction with the accompanying drawings. FIG. 1 is a simplified view of the restraint layer 100 when the module is inflated and identifies the window opening 102. The restraint layer has two radial strap assemblies 104 each one of which is disposed on opposite ends of a circumferential strap assembly 106. There is a plurality of circumferential straps 108 making up the circumferential strap assembly 106. In this figure, the window opening 102 is in the circumferential assembly. This is the preferred embodiment. However, the invention is not so limited. The window opening may be part of one, or both of, the radial strap assemblies 104.

Figure 2:
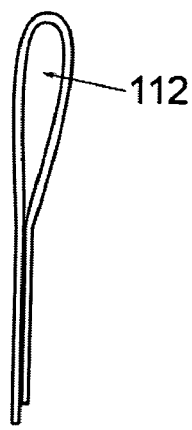
FIG. 2 is side view of a loop.

Also exhibited in FIG. 1 are a number of axial straps 110. The axial straps run along the longitudinal length of the flexible restraint layer 100. In the locality of the window opening 102, a number of the circumferential and axial straps terminate at the opening. FIG. 2 shows how the ends of the circumferential and radial straps abutting the window opening are formed into loops 112. The module is inflated by use of air or other types of gases as desired.

Figure 3:
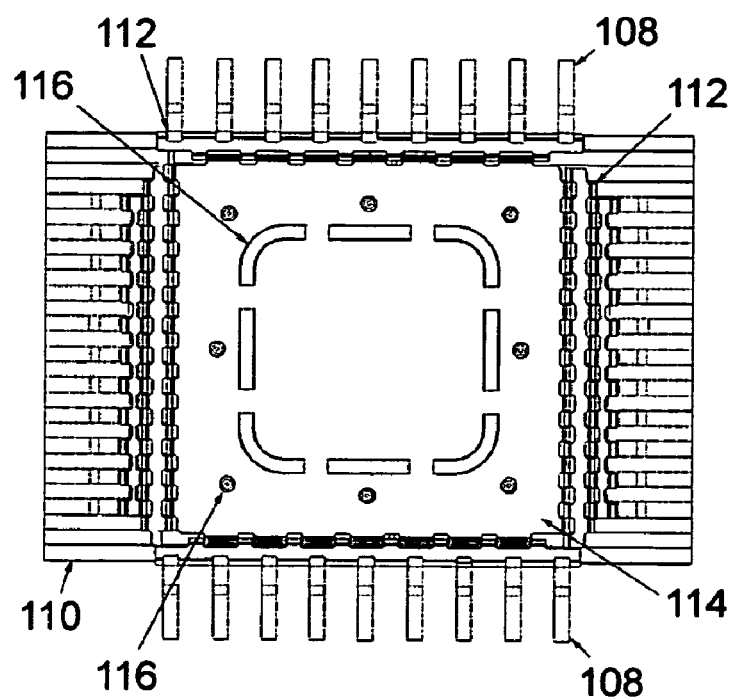
FIG. 3 is a top view of a window template.

Turning now to FIG. 3, a window template 114 is shown. In the preferred embodiment, loops 112 on the circumferential straps 108 and radial straps 110 are attached to the template to hold the template in place. This can be accomplished by well known means in the art including the use of rollers. In the preferred embodiment, the template is made of a rigid material such as metal. However, in alternate embodiments, the material may be semi-rigid and can include forms of plastic. Furthermore, the template is designed to conform to the circumference of the restraint layer.

The template 114 is shown in FIG. 3 with a number of holes 116 running through the template. In the preferred embodiment, these holes allow a technician to mark the underlying bladder to identify the location of the window when the bladder is inflated.

Figure 4:
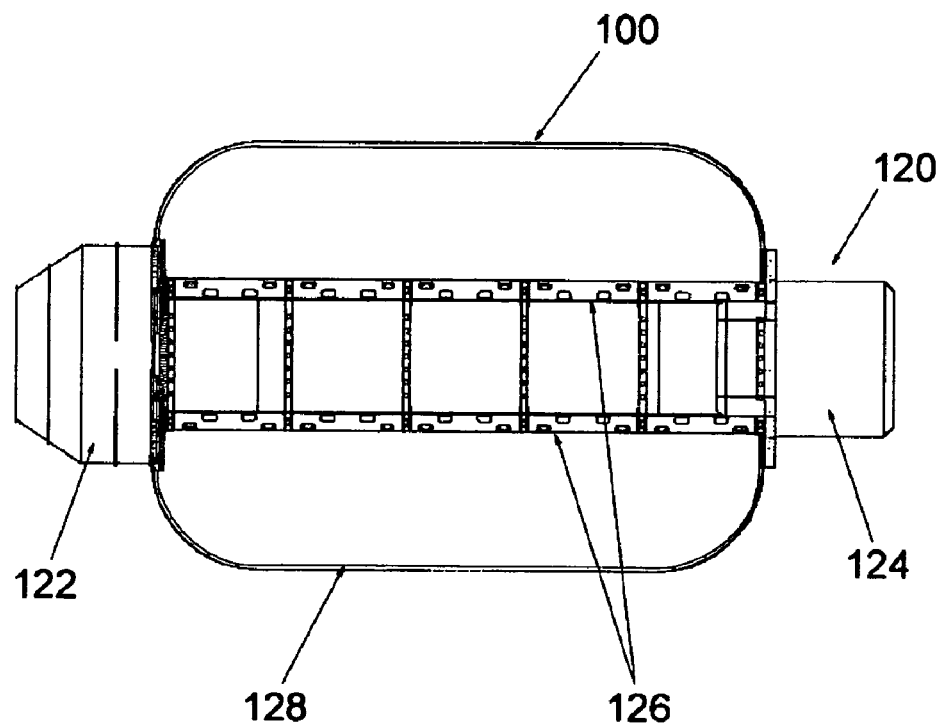
FIG. 4 is a cut-away side view of a module.

Addressing FIG. 4, the restraint layer 100 fits over a bladder 128. A rigid structural core 120 is comprised of a fore assembly 122 and an aft assembly 124 separated by at least one longeron 126. The restraint layer 100 and bladder 128 are secured to the ends of the core at the fore and aft assemblies by conventional means such as the use of end rings and/or attachment rings. The bladder and restraint layer are attached to the core in such a way as to substantially prevent loss of the gas within the module while the bladder is inflated.

Returning now to FIG. 1, the exterior surface of bladder 128 is visible from the outside of the figure. In practice, when the bladder is inflated the window template would be within the window opening 102. In this way, the bladder is restrained from extending through the opening 102.

Once the bladder is inflated, markings would be made on the exterior surface of the bladder 122 through the holes in the window template. In this way the location of the window would be identified on the exterior surface of the bladder. When the bladder is deflated, the template would be removed and the area identified on the exterior surface of the bladder would be cut away, or removed, from the bladder. A window would then be installed.

Figure 5:
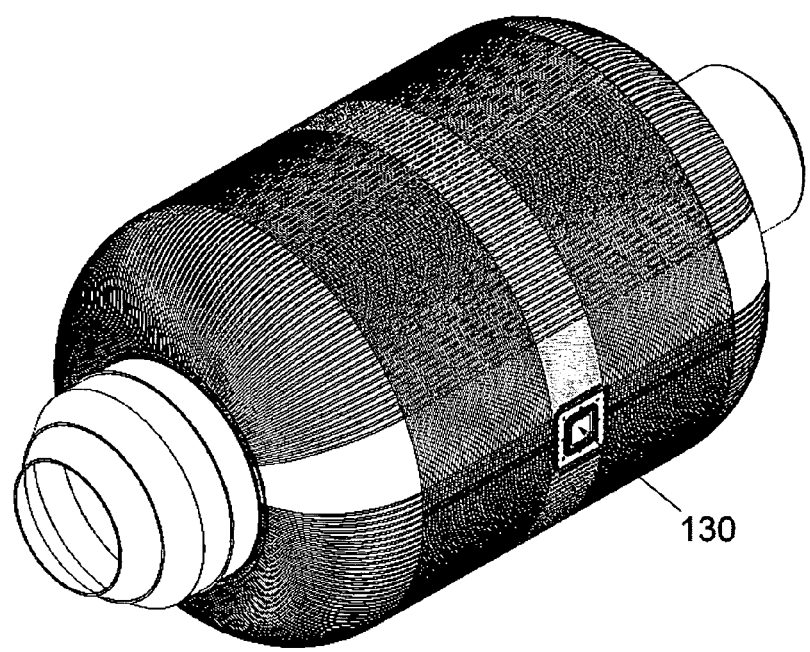
FIG. 5 is a view of the module with a window.

FIG. 5 shows, by example, how a module inflated with the window 130 installed might look.

Figure 6:
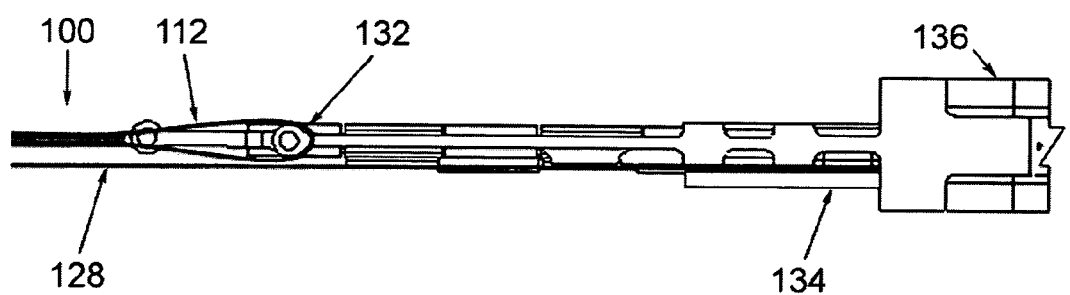
FIG. 6 is a partial cross-sectional view of a window.

FIG. 6 shows, by example, how a window 130 could be installed with the bladder 128 and restraint layer 100 providing support. There are connection points 132 that attach to the loops 112 of the restraint layer. Also, there are opposing sections 134 that fit over the bladder 128 securing the window to the bladder. Finally, there is a viewing port 136 comprised of a generally transparent material.

Figure 7:
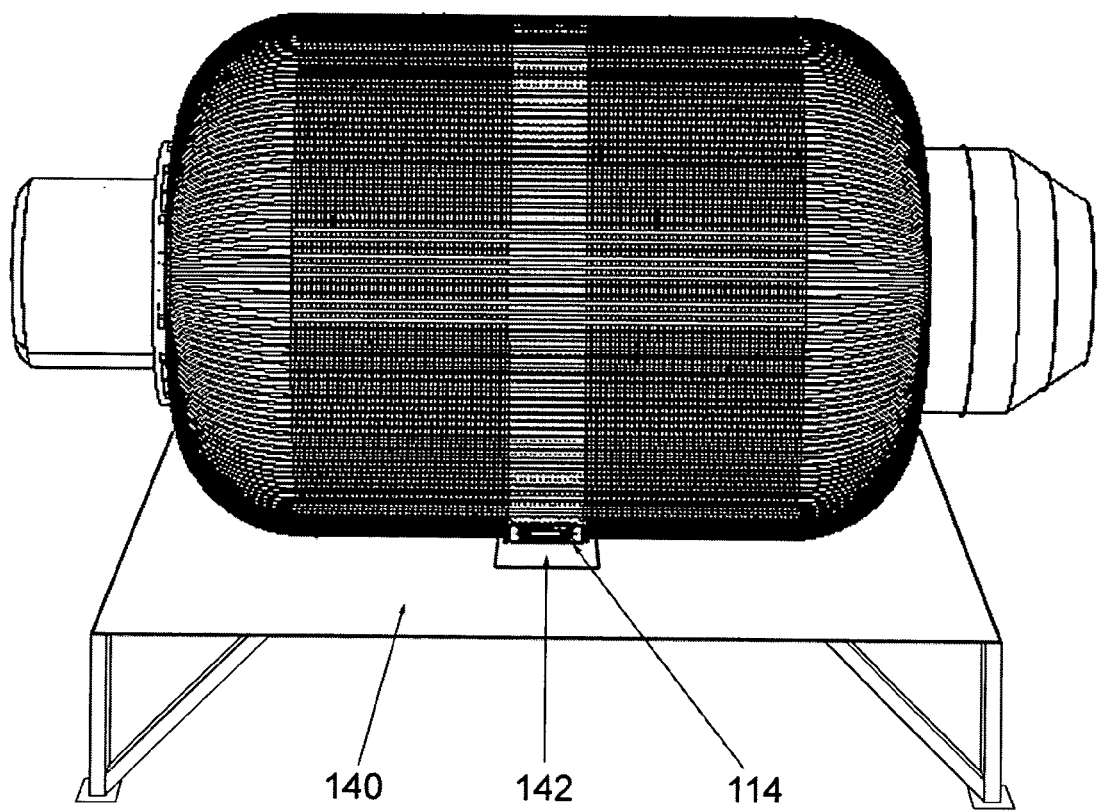
FIG. 7 is a side view of a horizontal support structure.

Turning now to FIG. 7, a horizontal support structure 140 is displayed with an access opening 142. This is the preferred embodiment. After the window template is used to identify the location of the window on the bladder, bladder is deflated with the template 114 positioned over the opening 142 in the support 140. The support is positioned such that the restraint layer and bladder rest on the support. The module may be raised or lowered by known conventional means to be placed into contact with the support 140.

When fully deflated, the template is removed and a hole is made in the bladder through the opening 142. The window can be installed with the restraint layer and bladder supporting the window. Then, the bladder can be re-inflated to repeat the process for installing more windows.

In a similar manner, the module may be positioned vertically and a support may be used to assist in the removal of the template, cutting of the bladder, and installation of a window. This is accomplished by known means in the art.

There has thus been described a novel method for making an opening in the bladder of an inflatable modular structure to receive a window. It is important to note that many configurations can be constructed from the ideas presented. The foregoing disclosure and description of the invention is illustrative and explanatory thereof and thus, nothing in the specification should be imported to limit the scope of the claims. Also, the scope of the invention is not intended to be limited to those embodiments described and includes equivalents thereto. It would be recognized by one skilled in the art the following claims would encompass a number of embodiments of the invention disclosed and claimed herein.

What is claimed is:

1. A method for making an opening in the bladder of an inflatable modular structure to receive a window where the inflatable modular structure has a core, a bladder having an external surface attached to the core, and a flexible restraint layer attached to the core and surrounding the bladder and the flexible restraint layer having an opening to accommodate a window, the method for preparing the opening in the bladder comprising the steps of:
    inserting a window outline template into the opening of the flexible restraint layer;
    inflating the bladder;
    identifying a portion of the external surface of the bladder lying under the window outline template in the flexible restraint layer;
    deflating the bladder;
    removing the window outline template; and
    removing the identified portion of the bladder.

2. The method of claim 1 wherein the flexible restraint layer has a plurality of openings to accommodate a number of windows and the method for preparing an opening in the bladder is repeated for each of the openings in the flexible restraint layer.

3. A method for making an opening in the bladder of an inflatable modular structure to receive a window where the inflatable modular structure has a core, a bladder having an outside surface and the bladder being attached to the core, and a flexible restraint layer attached to the core and surrounding the bladder and the flexible restraint layer having an opening to accommodate a window, the method for preparing an opening in the bladder comprising the steps of:
    placing a window outline template that simulates the size of a window within the proximity of the opening in the flexible restraint layer;
    inflating the bladder;
    identifying a portion of the external surface of the bladder lying under the window outline template in the flexible restraint layer;
    rotating the inflatable modular structure such that the window outline template is facing a support structure;
    deflating the bladder such that the outside surface of the bladder where the window outline template was placed is opposite said support structure;
    removing the window outline template from the opening; and
    removing the identified portion of the bladder.

4. The method of claim 3 wherein the flexible restraint layer has a plurality of openings to accommodate windows and the method for preparing an opening in the bladder is repeated for each of the openings in the flexible restraint layer.

5. The method of claim 3 wherein the core is substantially in a horizontal position.

* * * * *